(12) United States Patent
Buschmann (10) Patent No.: US 10,065,311 B1
(45) Date of Patent: Sep. 4, 2018

(54) SINGULARITY HANDLING FOR ROBOT JOGGING

(71) Applicant: X DEVELOPMENT LLC, Mountain View, CA (US)

(72) Inventor: Thomas Buschmann, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 157 days.

(21) Appl. No.: 15/177,319

(22) Filed: Jun. 8, 2016

(51) Int. Cl.
  *B25J 19/00* (2006.01)
  *B25J 9/16* (2006.01)

(52) U.S. Cl.
  CPC ............. *B25J 9/163* (2013.01); *B25J 9/1607* (2013.01); *B25J 9/1664* (2013.01)

(58) Field of Classification Search
  None
  See application file for complete search history.

(56) References Cited

U.S. PATENT DOCUMENTS

| | | | | |
|---|---|---|---|---|
| 4,505,166 A | * | 3/1985 | Tesar | B25J 9/04 403/103 |
| 4,680,519 A | | 7/1987 | Chand et al. | |
| 4,973,215 A | * | 11/1990 | Karlen | B25J 9/04 414/729 |
| 4,975,856 A | * | 12/1990 | Vold | B25J 9/1602 318/568.19 |
| 5,116,180 A | * | 5/1992 | Fung | B25J 9/1689 414/5 |
| 5,155,423 A | * | 10/1992 | Karlen | B25J 9/04 318/568.1 |
| 5,590,034 A | | 12/1996 | Snell | |
| 6,317,651 B1 | * | 11/2001 | Gerstenberger | B25J 9/1664 700/245 |
| 6,772,053 B2 | * | 8/2004 | Niemeyer | B25J 9/1689 700/302 |
| 7,673,537 B2 | | 3/2010 | Lessard et al. | |

(Continued)

OTHER PUBLICATIONS

Bonev, Ilian A., Dimiter Zlatanov, and Clément M. Gosselin. "Singularity analysis of 3-DOF planar parallel mechanisms via screw theory." Journal of Mechanical Design 125, No. 3 (2003): 573-581 Jan. 1, 2003.

(Continued)

*Primary Examiner* — Truc M Do
(74) *Attorney, Agent, or Firm* — Middleton Reutlinger (57) ABSTRACT

Methods, apparatus, systems, and computer-readable media are provided for avoiding and/or operating robots through singularities. In various implementations, a Cartesian input velocity to be attained by a robot end effector may be received as user input. An attainable velocity of the end effector may be determined that excludes at least one directional component deemed unattainable by the end effector based on physical attribute(s) of the robot. Joint velocities to be attained by joints of the robot in joint space to move the end effector pursuant to the attainable velocity in configuration space may be calculated and scaled to account for a joint velocity limit associated with at least one joint. Actuator trajectories may be calculated for the joints of the robot based at least in part on the scaled joint velocities. The joints of the robot may then be operated in accordance with the calculated joint trajectories.

20 Claims, 7 Drawing Sheets

(56) References Cited

U.S. PATENT DOCUMENTS

| | | | |
|---|---|---|---|
| 7,707,907 B2 | 5/2010 | Bonev | |
| 8,543,239 B2* | 9/2013 | Oga | B25J 9/1651 700/245 |
| 9,592,608 B1* | 3/2017 | Bingham | B25J 9/1674 |
| 2002/0120363 A1* | 8/2002 | Salisbury | B25J 3/00 700/254 |
| 2003/0171847 A1* | 9/2003 | Cheng | G05B 19/4103 700/245 |
| 2005/0125100 A1* | 6/2005 | Stoddard | B25J 9/1607 700/245 |
| 2007/0013336 A1* | 1/2007 | Nowlin | B25J 9/1682 318/568.21 |
| 2007/0112468 A1* | 5/2007 | Freeman | B25J 9/1607 700/265 |
| 2007/0138992 A1* | 6/2007 | Prisco | A61B 19/22 318/568.21 |
| 2007/0151389 A1* | 7/2007 | Prisco | B25J 9/1633 74/490.05 |
| 2008/0294285 A1* | 11/2008 | Shoham | B25J 9/1623 700/245 |
| 2011/0066282 A1* | 3/2011 | Bosscher | B25J 9/1676 700/248 |
| 2011/0172824 A1* | 7/2011 | Park | B25J 9/1648 700/261 |
| 2012/0158179 A1* | 6/2012 | Ooga | B25J 9/1633 700/259 |
| 2012/0215354 A1* | 8/2012 | Krasny | B25J 9/1666 700/255 |
| 2012/0290131 A1* | 11/2012 | Khoukhi | B25J 9/1623 700/250 |
| 2013/0338827 A1* | 12/2013 | One | B25J 9/10 700/252 |
| 2014/0276953 A1* | 9/2014 | Swarup | B25J 18/007 606/130 |
| 2016/0279788 A1* | 9/2016 | Kanaoka | B25J 3/04 |
| 2017/0088360 A1* | 3/2017 | Brazeau | B65G 31/00 |

OTHER PUBLICATIONS

Carricato, Marco, and Vincenzo Parenti-Castelli. "Singularity-free fully-isotropic translational parallel mechanisms." The International Journal of Robotics Research 21, No. 2 (2002): 161-174 Jan. 1, 2002.

Owen-Hill, Alex. "Why Singularities can Ruin Your Day." Robotiq. Feb. 22, 2016. 12 pages. http://blog.robotiq.com/why-singularities-can-ruin-your-day Feb. 22, 2016.

Briot, Sébastien, and Ilian A. Bonev. "Singularity analysis of zero-torsion parallel mechanisms." In Intelligent Robots and Systems, 2008. IROS 2008. IEEE/RSJ International Conference on, pp. 1952-1957. IEEE, 2008 Jan. 1, 2008.

Han, Hyejin, and Jaeheung Park. "Robot control near singularity and joint limit using a continuous task transition algorithm." International Journal of Advance Robotic Systems 10 (2013). 10 pages Jan. 1, 2013.

* cited by examiner

SINGULARITY HANDLING FOR ROBOT JOGGING

BACKGROUND

Robots can be moved in various ways. For example, industrial robots with very specific tasks are typically provided with well-defined and/or well-thought-out paths to be followed by end effectors in configuration (i.e. Cartesian) space. These paths may be converted to joint trajectories (in a process referred to as "inverse kinematics") that are actually implemented by joints of the robot in order for the robot to move the end effector along the provided path. In many instances, the paths and/or corresponding joint actuator trajectories may be pre-calculated (e.g., tailored) to avoid singularities. However, robots may also be controlled interactively, e.g., by manually "jogging" the robot and/or its end effector in Cartesian space, e.g., using a joystick or directional buttons. Because paths followed by end effectors of interactively-controlled robots may be unpredictable, it might not be feasible to pre-calculate or tailor joint actuator trajectories to avoid singularities. Consequently, when interactively-controlled robots approach or reach singularities, they may behave erratically and/or shut down (e.g., as a safety mechanism).

SUMMARY

The present disclosure is generally directed to methods, apparatus, and computer-readable media (transitory and non-transitory) for avoiding and/or operating robots through singularities. In particular, in various implementations, one or more unattainable directional components of an input velocity received from a user may be discarded so that a new, attainable velocity remains. Joint velocities required to achieve the attainable velocity may then be calculated. If any of those joint velocities exceeds (or in some cases approaches too closely) a respective joint velocity limit, then those joint velocities may be scaled down, e.g., in a manner that maintains relative magnitude amongst the varying joint velocities in order to preserve the direction of motion.

The scaled down joint velocities may then be used to calculate joint actuator trajectories (or simply, "actuator trajectories") to be implemented by the joints of the robot to move the end effector in accordance with the attainable velocity. In some implementations, higher order time integration schemes such as the Runge-Kutta family of time integration schemes (e.g., "RK4") may be used to calculate the actuator trajectories using the scaled down joint velocities. The robot may then be operated in accordance with the calculated actuator trajectories.

In some implementations, a computer implemented method may be provided that includes the steps of: receiving an input velocity to be attained by an end effector of a robot in configuration space of the end effector; determining an attainable velocity of the end effector that excludes at least one directional component of the input velocity determined to be unattainable by the end effector based on one or more physical attributes of the robot; calculating one or more joint velocities that will be attained by one or more joints of the robot in joint space to move the end effector pursuant to the attainable velocity in configuration space; scaling the one or more joint velocities to account for a joint velocity limit associated with at least one of the one or more joints; calculating one or more actuator trajectories for the one or more joints of the robot based at least in part on the scaled one or more joint velocities; and operating the one or more joints of the robot in accordance with the calculated joint trajectories.

This method and other implementations of technology disclosed herein may each optionally include one or more of the following features.

In various implementations, the one or more joint velocities may include a plurality of joint velocities that are scaled by proportionate amounts. In various implementations, calculating the one or more actuator trajectories may include determining the one or more actuator trajectories using a higher order function. In various implementations, the higher order method may include a time integration scheme. In various implementations, the higher order method may include the Runge-Kutta method.

In various implementations, the unattainable directional component may include a direction in which a kinematic chain comprised of the one or more joints is already extended a maximum distance. In various implementations, the unattainable directional component may include a direction in which a kinematic chain comprised of the one or more joints would reach a singularity.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
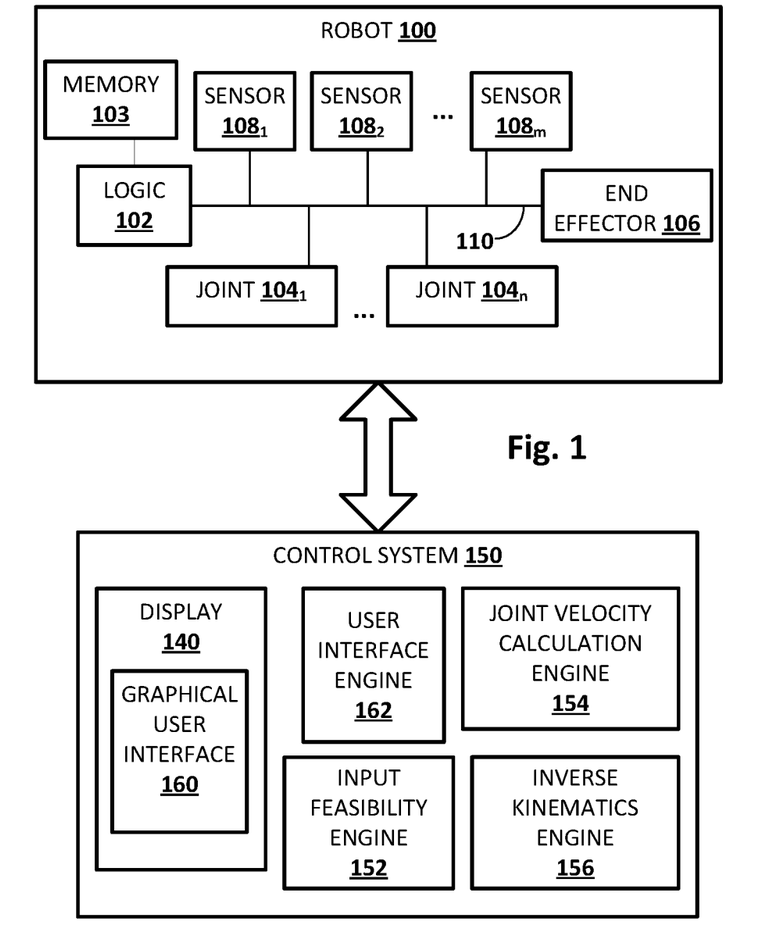
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, a unmanned aerial vehicle ("UAV"), and so forth. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more joints $104_{1-n}$, one or more end effectors 106, and/or one or more sensors $108_{1-m}$, e.g., via one or more buses 110. As used herein, a robot "joint" 104 may broadly refer to actuators, motors (e.g., servo motors), joints, shafts, gear trains, pumps (e.g., air or liquid), pistons, drives, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, fluid nozzles, and so forth. In some implementations, end effector 106 may be removable, and various types of modular end effectors may be installed onto robot 100, depending on the circumstances.

Sensors 108 may take various forms, including but not limited to 3D laser scanners or other 3D vision sensors (e.g., stereographic cameras used to perform stereo visual odometry) configured to provide depth measurements, two-dimensional cameras, light sensors (e.g., passive infrared), force sensors, pressure sensors, pressure wave sensors (e.g., microphones), proximity sensors (also referred to as "distance sensors"), depth sensors, torque sensors, bar code readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting. In some implementations, sensors 108 may be located external to, but may be in direct or indirect communication with, robot 100, e.g., as standalone units or as part of control system 150.

Control system 150 may include one or computing systems connected by one or more networks (not depicted) that control operation of robot 100 to various degrees. An example of such a computing system is depicted schematically in FIG. 5. In some implementations, control system 150 may be operated by a user (not depicted) to exert a relatively high level of control over robot 100, e.g., in real time in response to signals received by a user interface engine 162 and/or one or more readings from one or more sensors 108. For example, a user may interact with a graphical user interface 160 rendered on a display 140 (e.g., CRT, LCD, touchscreen, etc.) by user interface engine 162 to interactively "jog" various components of the robot in various directions, e.g., by providing robot 100 with one or more input velocities for robot 100 itself and/or end effector 106.

Various modules or engines may be implemented as part of control system 150 as software, hardware, or any combination of the two. For example, in FIG. 1, control system 150 includes an input feasibility engine 152, a joint velocity calculation engine 154, an inverse kinematics engine 156, and the aforementioned user interface engine 162. While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using logic 102 of robot 100.

Input feasibility engine 152 may be configured to receive, e.g., via input received from a robot operator through graphical user interface 160 or from a user manually "jogging" robot 100 by pushing/pulling one or more portions of robot 100, an input velocity to be attained by end effector 106 in configuration space of end effector 106. Input feasibility engine 152 may then determine an attainable velocity (i.e., a vector having a direction and a magnitude or speed) of end effector 106 that excludes at least one "directional component" (e.g., a translational or rotational velocity) of the input velocity determined to be unattainable by end effector 106 based on one or more physical attributes of robot 100. For example, and as will be demonstrated below, input feasibility engine 152 may determine that the operator is attempting to move end effector 106 in a direction that includes at least one directional component that is beyond the robot arm's reach. In such case, input feasibility engine 152 may determine directional components of the input velocity in configuration/Cartesian space (e.g., an X component, a Y component, and a Z component), and may disregard/discard the component determined to be infeasible. The remaining feasible directional components may then be used to determine an attainable input velocity that tracks the input velocity as closely as possible without violating the configuration space of end effector 106.

In various implementations, the attainable input velocity may be provided to joint velocity calculation engine 154. Joint velocity calculation engine 154 may be configured to calculate one or more joint velocities that will be attained by one or more joints 104 of robot 100 in joint space to move end effector 106 pursuant to the attainable velocity in configuration space. For example, in some implementations, so-called "velocity-level" inverse kinematics may be performed to compute joint velocities corresponding to end effector velocities for known/fixed positions. In some implementations, this analysis may facilitate disregarding/discarding unattainable/infeasible directional components of the input velocity, in addition to or instead of the analysis performed by input feasibility engine 152.

For example, suppose techniques described herein are applied to interactive operation of a common six-joint industrial robot. Velocity-level inverse kinematics may be performed in two steps. First, velocities of the first three joints may be computed. Next, the remaining "wrist" joint velocities may be computed. Both steps may involve solving a sequence of algebraic equations—e.g., the end-effector Jacobian of the robot derived, for instance, from its kinematic equations—for velocities of the joints in question. Infeasible directional components of the input velocity may become evident as one or more of these equations becomes singular. Remaining feasible directional components may be computed from a set of equations (e.g., kinematic equations and/or their time derivatives) obtained from a prior kinematics analysis of robot 100. Additionally or alternatively, numerical analysis may be applied to the set of algebraic equations to identify singularities.

In various implementations, joint velocity calculation engine 154 may be further configured to scale the calculated joint velocities to account for a joint velocity limit associated with at least one or more joints 104. For example, if a calculated joint velocity (e.g., a rotational speed) would exceed a joint velocity limit (e.g., a joint rotation speed limit) associated with a particular joint 104, that joint velocity may be scaled down to a value that does not violate the joint velocity speed limit. Calculated joint velocities of other joints 104 in the kinematic chain may also be scaled down proportionally, e.g., to maintain relatively joint velocities amongst the joints, regardless of whether their respective calculated jointed velocities would violate their respective joint velocity limits, in order to achieve the attainable input velocity of end effector 106.

The scaled down joint velocities may be provided to inverse kinematics engine 156. Inverse kinematics engine 156 may be configured to calculate one or more actuator trajectories (or "position values") for one or more joints 104 of robot 100 based at least in part on the scaled joint velocities. In some implementations, inverse kinematics engine 156 may employ higher order methods to numerically integrate the scaled joint velocities, for example using methods such as the Runge-Kutta method ("RK4"), to calculate the one or more actuator trajectories. One or more joints 104 of robot 100 may then be operated in accordance with the calculated joint trajectories.

Figure 2A:
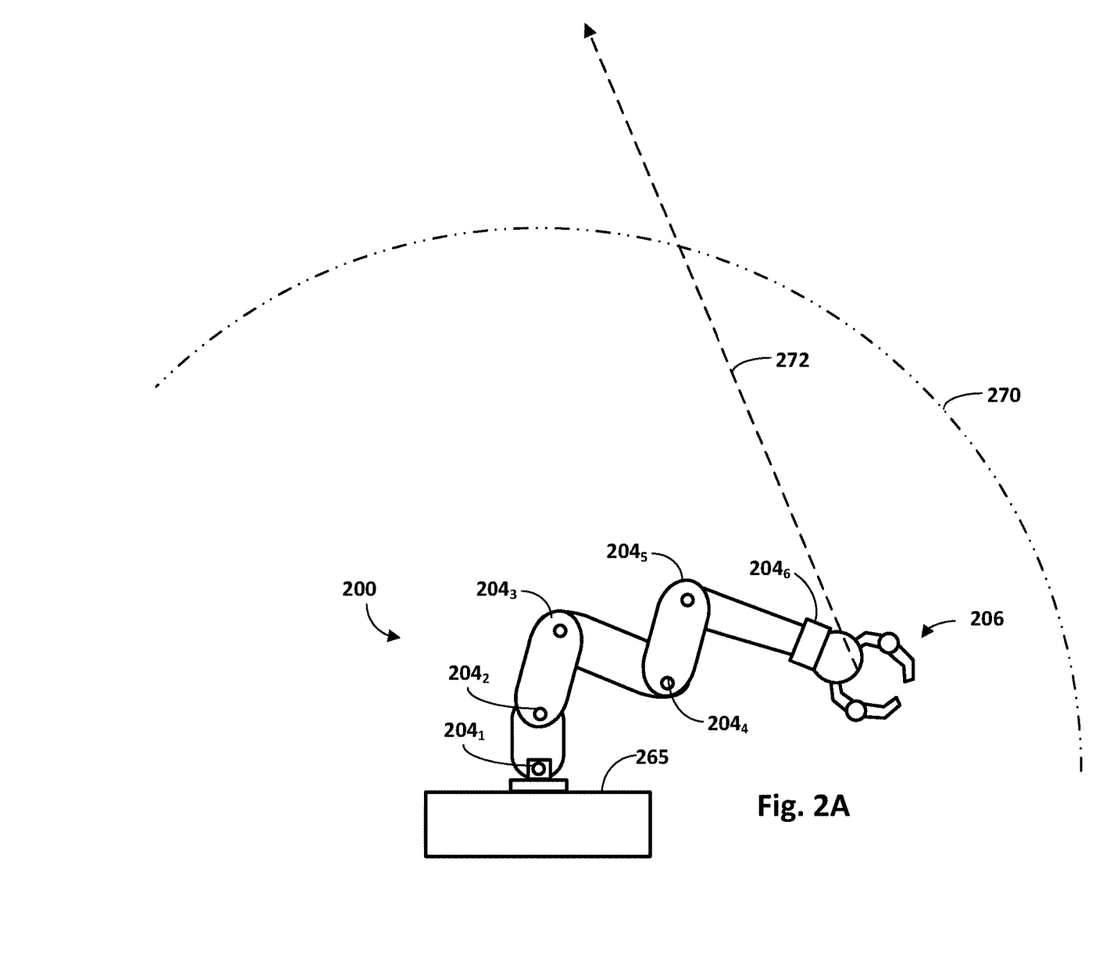
FIGS. 2A, 2B, and 2C depict one example of how disclosed techniques may be practiced, in accordance with various implementations.

FIG. 2A depicts a non-limiting example of a robot 200 in the form of a robot arm. An end effector 206 in the form of a gripper claw is attached to a sixth joint $204_6$ of robot 200. In this example, six joints $204_{1-6}$ are indicated. However, this is not meant to be limiting, and robots may have any number of joints. Robot 200 also includes a base 265. A boundary 270 is depicted as a dot-dot-dashed line to indicate a boundary of a configuration space of end effector 206. Put another way, physical limitations of robot 200, such as a length of its kinematic chain from first joint $204_1$ to end effector 206, cannot move end effector 206 outside of boundary 270.

Suppose a user interactively (e.g., manually using graphical user interface 160 or a joystick) instructs robot 200 to move (i.e. "jog") end effector 206 along line 272 at a particular speed. Line 272 in conjunction with the speed may represent an input velocity vector (or simply "input velocity" because velocity is a vector). It can be readily seen that line 272 extends outside of boundary 270, and hence beyond the available configuration space of end effector 206. Accordingly, at least one directional component of the input velocity represented by line 272 outside of boundary 270 is infeasible.

Figure 2B:
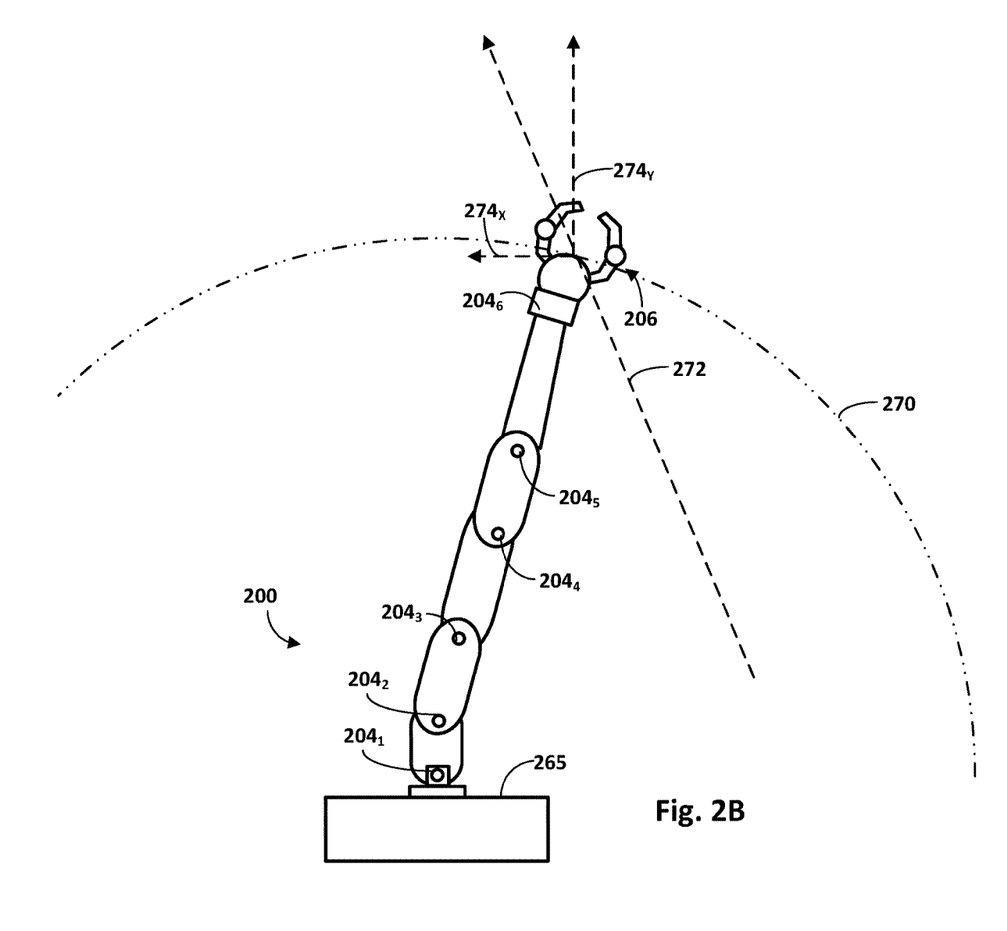

FIG. 2B depicts robot 200 after end effector 206 has been jogged to a position in which, if the input velocity represented by line 272 is broken down into its X and Y directional components, $274_X$ and $274_Y$, respectively (assuming that Z axis extends normal from the page for simplicity's sake), the Y directional component $274_Y$ is no longer feasible. The X directional component $274_X$, on the other hand, is still attainable by end effector 206.

In various implementations, the Y directional component $274_Y$ may be disregarded/discarded. The X directional component $274_X$, along with any attainable Z directional component (not depicted in FIG. 2B for simplicity's sake), may be used to construct a new "attainable" input vector, which in this case may or may not track the X directional component $274_X$. Consequently, in spite of the operator continuing to provide input (e.g., holding a joystick in the same position) that would otherwise cause robot 200 to jog end effector 206 along line 272, end effector 206 may instead follow the attainable input vector that tracks X directional component $274_X$.

Figure 2C:
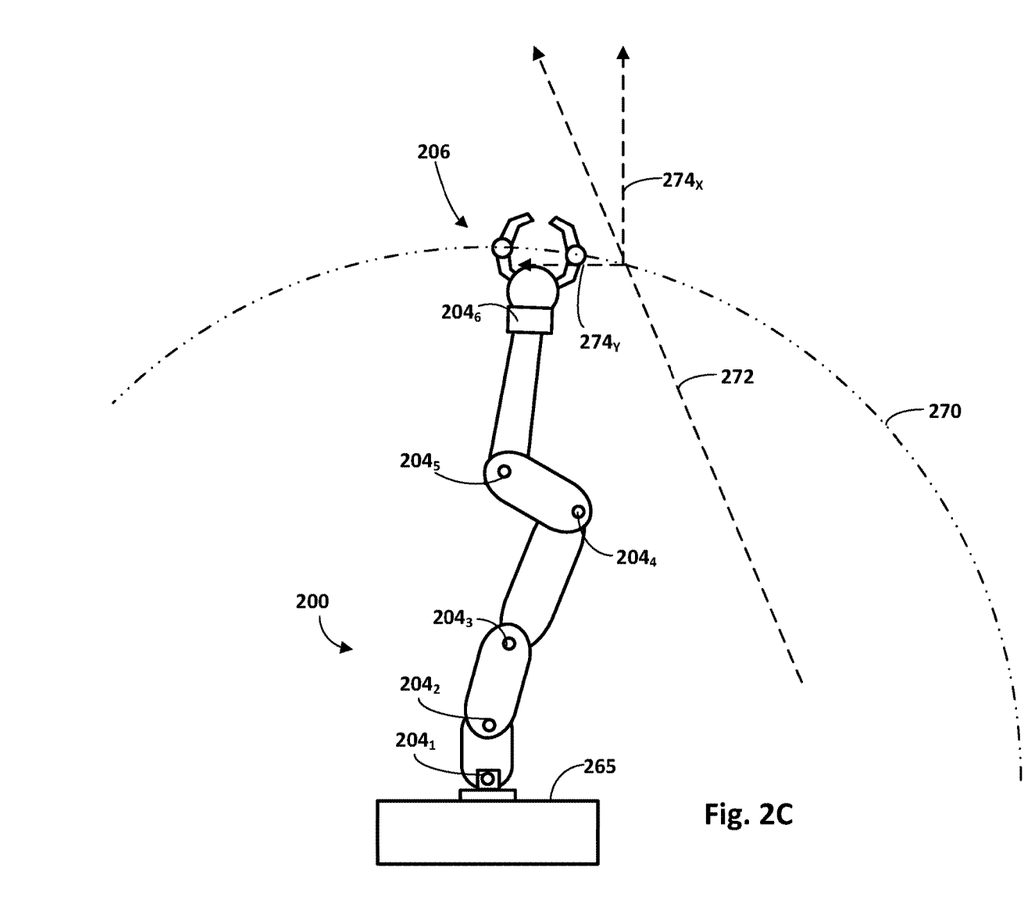

This continued movement is depicted in FIG. 2C, in which end effector 206 has moved some distance along X directional component $274_X$. At this point, end effector 206 is slightly below boundary 270 in the Y direction, which means it may currently be feasible for end effector 206 to be moved slightly in the Y direction. Accordingly, a new attainable input vector may be computed that reincorporates the Y directional component to the extent permitted by boundary 270. Given such a procedure, it would appear that end effector 206 moves along a repeated "stair step" path up and to the left in FIGS. 2A-C. However, this is for illustrative purposes only. It should be understood that in various implementations, the calculation and recalculation of the attainable input vector (and the accompanying discarding and/or reincorporation of infeasible directional components) would be performed at a highly granular level. Accordingly, end effector 206 would actually move in what appears to be an arc that approximately tracks boundary 270.

Robot 200 is at or near so-called "elbow" singularity in FIG. 2C. Consequently, the nominal actuator trajectory of the kinematic chain of joints $204_{1-6}$ that would be required to transition robot 200 from the pose depicted in FIG. 2A to those depicted in FIGS. 2B and 2C would likely approach or even exceed one or more joint velocity limits associated with one or more joints 204. Accordingly, and as was described above, joint velocity calculation engine 154 may calculate joint velocities that would be attained by joints $204_{1-6}$ to implement such an actuator trajectory. If any individual calculated joint velocity would exceed a joint velocity limit associated with a corresponding joint 204 (e.g., set by the manufacturer, dictated by physical limitations of a motor or other similar mechanisms in the joint, etc.), then joint velocity calculation engine 154 may scale down the would-be-exceeded individual joint velocity by an amount sufficient to safely operate that joint. Likewise, calculated joint velocities associated with other joints 204, regardless of whether they would exceed their respective joint velocity limits, will also be scaled down, e.g., by amounts that are proportionate to each other and/or the amount the initial joint 204 was scaled down.

As described above, once the calculated joint velocities are scaled down to safe levels, inverse kinematics engine 156 may calculate actuator trajectories for joints $204_{1-6}$ to move end effector 206 along the attainable input velocity, e.g., using one or more higher order methods described above. Robot 200 may then operate joints $204_{1-6}$ in accordance with these calculated actuator trajectories. In the example of FIGS. 2A-C, the operator would observe end effector 206 moving along line 272 until robot 200 is extended as far as possible (i.e., to boundary 270). Then, end effector 206 would move along an arc that approximately tracks boundary 270 until it arrives at a position slightly above that of end effector 206 as depicted in FIG. 2C (e.g., at boundary 207).

Figure 3:
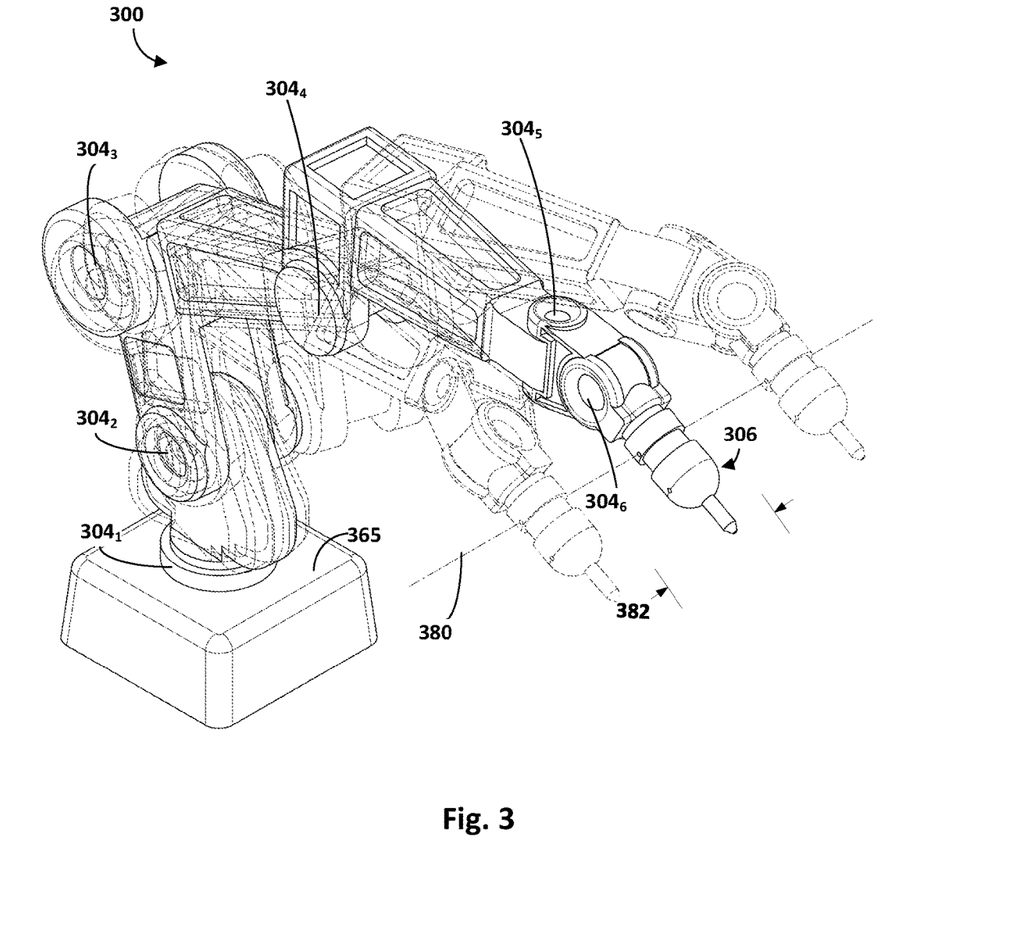
FIG. 3 depicts another example of how disclosed techniques may be practiced, in accordance with various implementations.

FIG. 3 depicts an example of how disclosed techniques may be applied to another type of robot singularity commonly referred to as a "wrist" singularity. A robot 300 once again takes the form of a robot arm that includes a plurality of joints $304_{1-6}$ (the exact number of joints is not important for this example). End effector 306 in this example takes the form of a nozzle that can be used, for instance, to spray fluids such as paint, adhesive, caulk, and so forth. However, other types of end effectors may be used instead, such as gripper claws, welding torches, and so forth.

Suppose an operator is providing constant input (e.g., using a joystick or graphical user interface 160) to cause robot 300 to jog end effector 306 along the velocity vector 380. Suppose further that the particular sequence of poses implemented by robot 300 to move end effector 306 in accordance with velocity input 380 causes two or more wrist axes to align with each other while end effector 306 moves through a central portion 382 of velocity input vector 380, thereby creating a wrist singularity. In order to move end effector 306 through the central portion 382 (and hence, the singularity) at a speed that remains constant throughout input velocity 380, one or more individual joint velocities attained by one or more joints 304 may approach infinity, or at the very least may surpass joint velocity limits associated with joints 304 of robot 300.

In order to avoid diverting end effector 306 from the line represented by input velocity 380 while addressing (e.g., avoiding, operating through) the singularity, one or more joints 304 of robot 300 may be required to be translated and/or otherwise operated along one or more directional components that are in fact, infeasible. Accordingly, and as was described above, in various implementations, the one or more directional components deemed infeasible may be disregarded/discarded, e.g., by input feasibility engine 152. The remaining attainable directional components may be retained and used, e.g., by input feasibility engine 152, to compute a new attainable input vector. As was described before, joint velocities that would be attained by joints 304 to achieve the attainable input velocity may be calculated, e.g., by joint velocity calculation engine 154, and if necessary, scaled down to comport with one or more joint velocities. The scaled down joint velocities may then be used, e.g., by inverse kinematics engine☐ 156, to calculate actuator trajectories to be implemented by joints $304_{1-6}$ to safely move end effector along the line represented by input velocity 380. End effector 306 may not diverge from that path in this example. Instead, end effector 306 may simply slow down through central portion 382 in order to give various joints 304 sufficient time to transition between poses without violating joint velocity limits.

The examples depicted in FIGS. 2A-C and 3 demonstrate how disclosed techniques may be implemented in scenarios in which robot arms may approach or reach particular types of singularities. However, this is not meant to be limiting. In various implementations, similar techniques may be performed to avoid/operate through other types of singularities experienced by robot arms, such as so-called "shoulder" singularities. More generally, disclosed techniques may be employed to operate other types of robots through various types of singularities that depend on the form of the robot, its kinematic chain of joints, and so forth.

Figure 4:
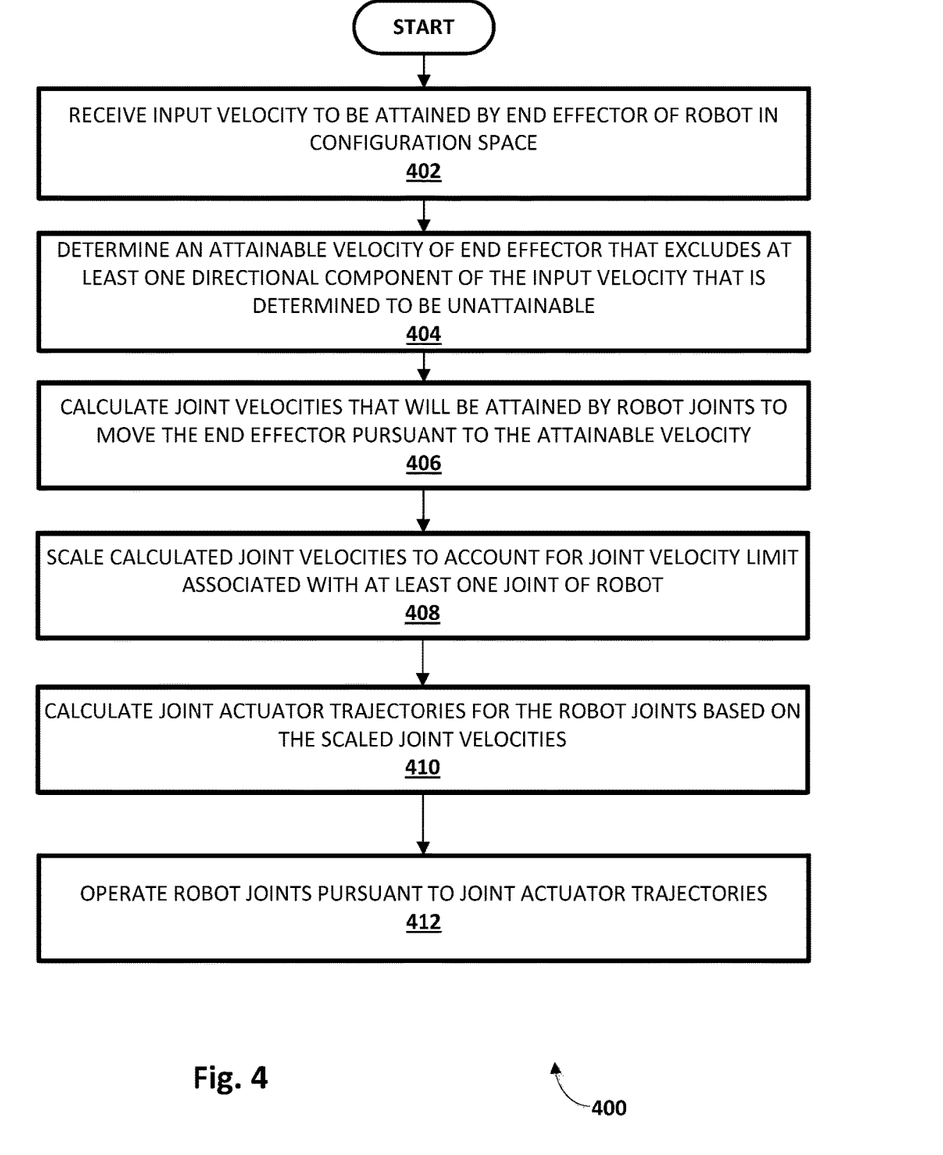
FIG. 4 depicts an example method in accordance with various implementations.

Referring now to FIG. 4, an example method 400 of interactively operating a robot to avoid and/or operate through singularities is described. For convenience, the operations of the flowchart are described with reference to a system that performs the operations. This system may include various components of various computer systems. For instance, some operations may be performed at robot 100, while other operations may be performed by one or more components of control system 150. Moreover, while operations of method 400 are shown in a particular order, this is not meant to be limiting. One or more operations may be reordered, omitted or added.

At block 402, the system may receive, e.g., via a user providing input using a joystick, graphical user interface 160, one or more other types of controls, or even through a user manually pushing/pulling one or more portions of a robot, an input velocity to be attained by an end effector in configuration (Cartesian) space. At block 404, the system may determine an attainable velocity of the end effector that excludes at least one directional component (e.g., X, Y, Z, rotational) of the input velocity that is determined to be unattainable. For example, the directional component may exceed configuration space boundaries associated with the end effector (as demonstrated in the "elbow" singularity example described above), or may call for one or more joints to move/translate/rotate in a direction that is unattainable give the current configuration of the kinematic chain of joints (e.g., as demonstrated in the "wrist" singularity example described above).

At block 406, the system may calculate joint velocities that will be attained by robot joints to move the end effector pursuant to the attainable input velocity determined at block 404. At block 408, one or more joint velocities calculated at block 406 may be scaled down as necessary to account for one or more joint velocity limits imposed by one or more joints of the robot. At block 410, the system may numerically integrate the scaled down joint velocities to calculate joint actuator trajectories for the robot joints. At block 412, the system may operate the robot pursuant to the joint actuator trajectories calculated at block 410.

Figure 5:
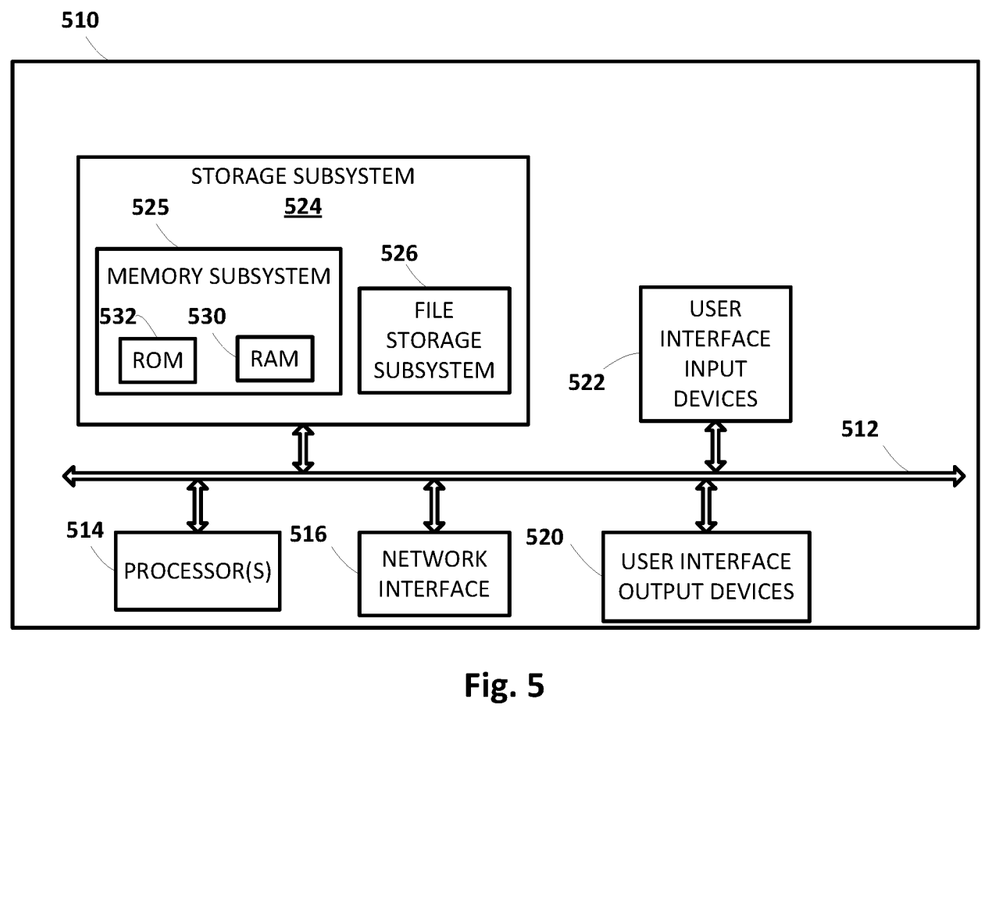
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100 or control system 150. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
receiving, by one or more processors, an input velocity to be attained by an end effector of a robot in configuration space of the end effector;
identifying as unattainable by the end effector, by one or more of the processors and based on one or more physical attributes of the robot, at least a first translational or rotational velocity component of the input velocity;
identifying as attainable by the end effector, by one or more of the processors and based on one or more physical attributes of the robot, at least a second translational or rotational velocity component of the input velocity;
determining, by one or more of the processors, an attainable velocity of the end effector that excludes the at least first translational or rotational velocity and includes the at least second translational or rotational velocity;
calculating, by one or more of the processors, one or more joint velocities that will be attained by one or more joints of the robot in joint space to move the end effector pursuant to the attainable velocity in configuration space;
scaling, by one or more of the processors, the one or more joint velocities to account for a joint velocity limit associated with at least one of the one or more joints;
calculating, by one or more of the processors, one or more actuator trajectories for the one or more joints of the robot based at least in part on the scaled one or more joint velocities; and
operating, by one or more of the processors, the one or more joints of the robot in accordance with the calculated actuator trajectories.

2. The computer-implemented method of claim 1, wherein the one or more joint velocities comprises a plurality of joint velocities that are scaled by proportionate amounts.

3. The computer-implemented method of claim 2, wherein calculating the one or more actuator trajectories comprises determining the one or more actuator trajectories using a higher order function.

4. The computer-implemented method of claim 3, wherein the higher order method comprises a time integration scheme.

5. The computer-implemented method of claim 3, wherein the higher order method comprises the Runge-Kutta method.

6. The computer-implemented method of claim 1, wherein the first translational or rotational velocity component comprises a direction in which a kinematic chain comprised of the one or more joints is already extended a maximum distance.

7. The computer-implemented method of claim 1, wherein the first translational or rotational velocity component comprises a direction in which a kinematic chain comprised of the one or more joints would reach a singularity.

8. A system comprising one or more processors and memory storing instructions that, in response to execution of the instructions by the one or more processors, cause the one or more processors to:
receive an input velocity to be attained by an end effector of a robot in configuration space of the end effector;

identify as unattainable by the end effector, based on one or more physical attributes of the robot, at least a first translational or rotational velocity component of the input velocity;

identify as attainable by the end effector, based on one or more physical attributes of the robot, at least a second translational or rotational velocity component of the input velocity;

determine an attainable velocity of the end effector that excludes the at least first translational or rotational velocity and includes the at least second translational or rotational velocity;

calculate one or more joint velocities that will be attained by one or more joints of the robot in joint space to move the end effector pursuant to the attainable velocity in configuration space;

scale the one or more joint velocities to account for a joint velocity limit associated with at least one of the one or more joints;

calculate one or more actuator trajectories for the one or more joints of the robot based at least in part on the scaled one or more joint velocities; and operate the one or more joints of the robot in accordance with the calculated actuator trajectories.

9. The system of claim 8, wherein the one or more joint velocities comprises a plurality of joint velocities that are scaled by proportionate amounts.

10. The system of claim 9, wherein calculation of the one or more actuator trajectories comprises determining the one or more actuator trajectories using a higher order function.

11. The system of claim 10, wherein the higher order method comprises a time integration scheme.

12. The system of claim 10, wherein the higher order method comprises the Runge-Kutta method.

13. The system of claim 8, wherein the first translational or rotational velocity component comprises a direction in which a kinematic chain comprised of the one or more joints is already extended a maximum distance.

14. The system of claim 8, wherein the first translational or rotational velocity component comprises a direction in which a kinematic chain comprised of the one or more joints would reach a singularity.

15. At least one non-transitory computer-readable medium comprising instructions that, in response to execution of the instructions by one or more processors, cause the one or more processors to perform the following operations:

receiving an input velocity to be attained by an end effector of a robot in configuration space of the end effector;

identifying as unattainable by the end effector, based on one or more physical attributes of the robot, at least a first translational or rotational velocity component of the input velocity;

identifying as attainable by the end effector, based on one or more physical attributes of the robot, at least a second translational or rotational velocity component of the input velocity;

determining an attainable velocity of the end effector that excludes the at least first translational or rotational velocity and includes the at least second translational or rotational velocity;

calculating one or more joint velocities that will be attained by one or more joints of the robot in joint space to move the end effector pursuant to the attainable velocity in configuration space;

scaling the one or more joint velocities to account for a joint velocity limit associated with at least one of the one or more joints;

calculating one or more actuator trajectories for the one or more joints of the robot based at least in part on the scaled one or more joint velocities; and operating the one or more joints of the robot in accordance with the calculated actuator trajectories.

16. The non-transitory computer-readable medium of claim 15, wherein the one or more joint velocities comprises a plurality of joint velocities that are scaled by proportionate amounts.

17. The non-transitory computer-readable medium of claim 16, wherein calculating the one or more actuator trajectories comprises determining the one or more actuator trajectories using a higher order function.

18. The non-transitory computer-readable medium of claim 17, wherein the higher order method comprises a time integration scheme.

19. The non-transitory computer-readable medium of claim 17, wherein the higher order method comprises the Runge-Kutta method.

20. The non-transitory computer-readable medium of claim 15, wherein the first translational or rotational velocity component comprises a direction in which a kinematic chain comprised of the one or more joints is already extended a maximum distance.

* * * * *